United States Patent

[11] 3,582,911

[72] Inventor John P. Smith
Littleton, Colo.
[21] Appl. No. 781,023
[22] Filed Dec. 4, 1968
[45] Patented June 1, 1971
[73] Assignee Ferroxcube Corporation
Saugerties, N.Y.

[54] CORE MEMORY SELECTION MATRIX
5 Claims, 4 Drawing Figs.

[52] U.S. Cl. .......... 340/174
[51] Int. Cl. .......... G11c 7/00,
G11c 5/02, G11c 11/06
[50] Field of Search .......... 340/174

[56] References Cited

UNITED STATES PATENTS

| | | | |
|---|---|---|---|
| 3,343,147 | 9/1967 | Ashwell | 340/174 |
| 3,496,554 | 2/1970 | Stein | 340/174 |
| 3,500,359 | 3/1970 | Hsieh et al. | 114/218 |
| 3,508,224 | 4/1970 | Putternian | 340/174 |

*Primary Examiner*—Stanley M. Urynowicz, Jr.
*Attorney*—Frank R. Trifari

ABSTRACT: A selection circuit for a magnetic core memory-matrix array is provided with a current source for a reading or writing operation coupled directly to a group of storage lines at one end, the other end of each storage line being connected to a plurality of individual transistor switches which are addressable for a particular storage line, and a further switch, responsive to a logical read or write instruction, is provided for triggering groups of transistor line switches.

INVENTOR.
JOHN P. SMITH
BY [signature]
AGENT

INVENTOR.
JOHN P. SMITH
BY
AGENT

INVENTOR.
JOHN P. SMITH

BY

AGENT

CORE MEMORY SELECTION MATRIX

This invention relates to information storage systems and more particularly to selection circuitry for information storage matrix of the magnetic core variety.

The core memory is composed of an array of toroidally shaped cores of homogeneous polycrystalline ferrite composition which exhibit a square loop hysteresis characteristic and possess high values of remanent magnetic flux. The cores are usually arranged in rows and columns with a single conductor passed through each core of a column while a further conductor passes through each core of a row. Each of the row and column conductors serve a driving function for switching the core into either one of its two magnetically stable states. This is accomplished by placing half select magnitude currents along the desired row and column conductor, with the result that the core located at the intersection of the particular row and column conductor selected will receive the effect of a full, current pulse. The coincidence of the two currents will therefore switch only one core. All other cores on the selected column or row conductors will each receive half select magnitude current pulses and will not be switched. When a current pulse of sufficient magnitude is coupled to a core, the core is driven into either one of its two magnetically stable states. Depending upon the direction of the current, it will be switched into a state denoted as a "0" or as a "1." Following the drive pulse, the core will be in either one of its two remanent states where it will remain until changed by a current pulse in the opposite direction. Each core represents one bit of a word, a plurality of bits or cores in a prearranged configuration forming a multibit word.

When in the "1" state, the remanent condition of a core can be determined by inducing a current pulse to the core which will cause it to switch into the "0" state. When switching occurs, a voltage is induced in another wire, which is also threaded through the core, and commonly referred to as a sense wire. The voltage induced in the core is proportional to the change in magnetic flux per unit time.

If the core were already in the "0" state when the current pulse appeared for the sense operation, only a small change in magnetic flux would occur as the core is thus disturbed without being switched. The disturbing of a core results in a smaller output voltage than in the switching of a core.

Information which has been read out of a core may be replaced in a core by the proper application of coincident half current pulses in the desired direction along the desired lines in order to place the core back into its original condition or to change the state of the information stored therein. The foregoing process of storing the information into the core is termed writing, whereas recovery of the information is termed reading.

Errors in storing and retrieving information in magnetic core memories largely result from reading and writing currents which are either too large or too small. Since the operation of the device is dependent upon the coincidence of half current select pulses, the magnitude of the pulse must be sufficiently high such that in coincidence with another pulse of similar magnitude the core will be switched, whereas the magnitude of the half current pulse should not be so high as to switch the core without the presence of the complimentary coincident pulse. The values of the current pulse become even more critical when it is realized that the hysteresis characteristic for a magnetic core is not precisely rectangular. As a result, the application of a current pulse to a magnetic core will cause some shifting of magnetization either towards saturation or away from it, depending upon the polarity of the applied pulse. Thus, any value of current will shift the magnetization states of the core sufficiently to result in an output voltage of some finite magnitude being sensed along the sense conductor.

In order to avoid erroneous sense conductor readings from imprecise conductor current pulses, it is necessary that the individual conductor currents be controlled within a fairly narrow tolerance range. Particularly, the individual current pulse applied to either the row or column conductor must be maintained at a level insufficient to cause any of the cores to switch, whereas the coincidence of both row and column conductor pulses must result in a current pulse of sufficient magnitude to switch a selected core. Core magnetization characteristics are also affected by temperature and the individual characteristics of each core. All of these factors result in imposing significant narrowing limitations upon the range and variations permitted the row and column currents.

Conventional selection matrix circuitry employ individually selectable transistor current switches to energize particular lines or storage devices in accordance with predetermined selection. A conventional form of transistor current selection matrix employs a first transistor switch having a collector-emitter path coupling a voltage source to an end of at least one line of storage elements, and a second transistor switch having a collector emitter path coupling the other end of that same line to a drive current source. A second set of switches is similarly connected to the same line, one at either end. The first and second switches are used respectively for performing the read and write functions in that particular line. The foregoing described circuitry may be connected to a column line, and a similar set of circuitry connected to a row line. The row and column line current sources thus may be selectively coupled to a desired row and column line to select a particular core. The current source which is used to drive the desired row or column may be set at a desired current level to accomplish the correct switching within the particular tolerance range.

However, this conventional use of transistor selection results in several undesirable effects. Primarily, the current through the line will not be the current generated by the current source due to variations which are introduced by the selection circuitry itself. Particularly the switches located between the current source and the line will draw base current and result in the actual line current varying from the desired line current produced by the drive current source by a factor dependent upon the magnitude and polarity of the base current drawn by the particular transistor switch. Since many transistor switches will be employed, one for each line, while the same current source may be coupled through several of these transistors to the several lines, it becomes necessary to control the characteristics of the transistors such that each line will have a predetermined current level. However, this is rather undesirable, from an economic point of view, due to the expense of providing quality controlled transistors with base current requirements of all transistors being substantially similar one to each other.

An alternate solution of the foregoing problem has been to employ transformer coupling in order to remove the DC coupling to the base electrodes of the transistor, thereby eliminating undesirable current flow through the selection line. Although this has the effect of removing the unwanted variation, the use of these transformers have proven to be unwieldly and impractical both from a standpoint of packaging and from an economic point of view.

It is therefore a primary object of this invention to provide a novel selection matrix for an information storage system which will provide the desired current level on a selected storage line without unwanted variation.

It is a further object of this invention to provide an arrangement which will provide the desired current level on a selective storage line without the use of transformer stages or expensive quality controlled transistor circuitry.

Another disadvantage in the employment of selection schemes in conventional selection circuitry is the degree of duplication necessary for addressing the memory in either the read or write mode. Any reductions which can be made in the amount of circuitry which is necessary for selection in a memory system is advantageous in that it permits lower operating power requirements, reduces the number of potential heat sources, and lowers the effective cost per bit.

It is therefore a further object of this invention to provide a novel selection matrix for an information storage system which will provide the desired current level for both read and write operations with common addressing circuitry.

It is a still further object of this invention to provide a transistorized storage matrix which is easier to construct and which presents a significant advance in both cost and efficiency.

In accordance with the foregoing objects, the present invention provides an arrangement for selection of storage line switches by interstage circuitry wherein a drive current source is coupled directly to the selected storage line and serves to complete the current path between selection circuitry, storage line and ground or a reference voltage.

An additional switch connected in series with each drive switch is gated to provide either one or the other current flow direction through the selected line.

Since the drive current source is now directly coupled to the storage line without the presence of intervening branches, the current flow through the line can be exclusively defined by the current level of the source and unwanted variations caused by additional branch points coupled to the line is avoided. The additional switches are selectively gated to control current flow direction through the selected line, thereby defining a read or write operation. With read or write operations separately selected, common addressing circuitry can be employed.

The foregoing description and objects, as well as further objects and features, will be more clearly understood from a consideration of the following detailed description taken in connection with the accompanying drawings wherein.

Figure 1:
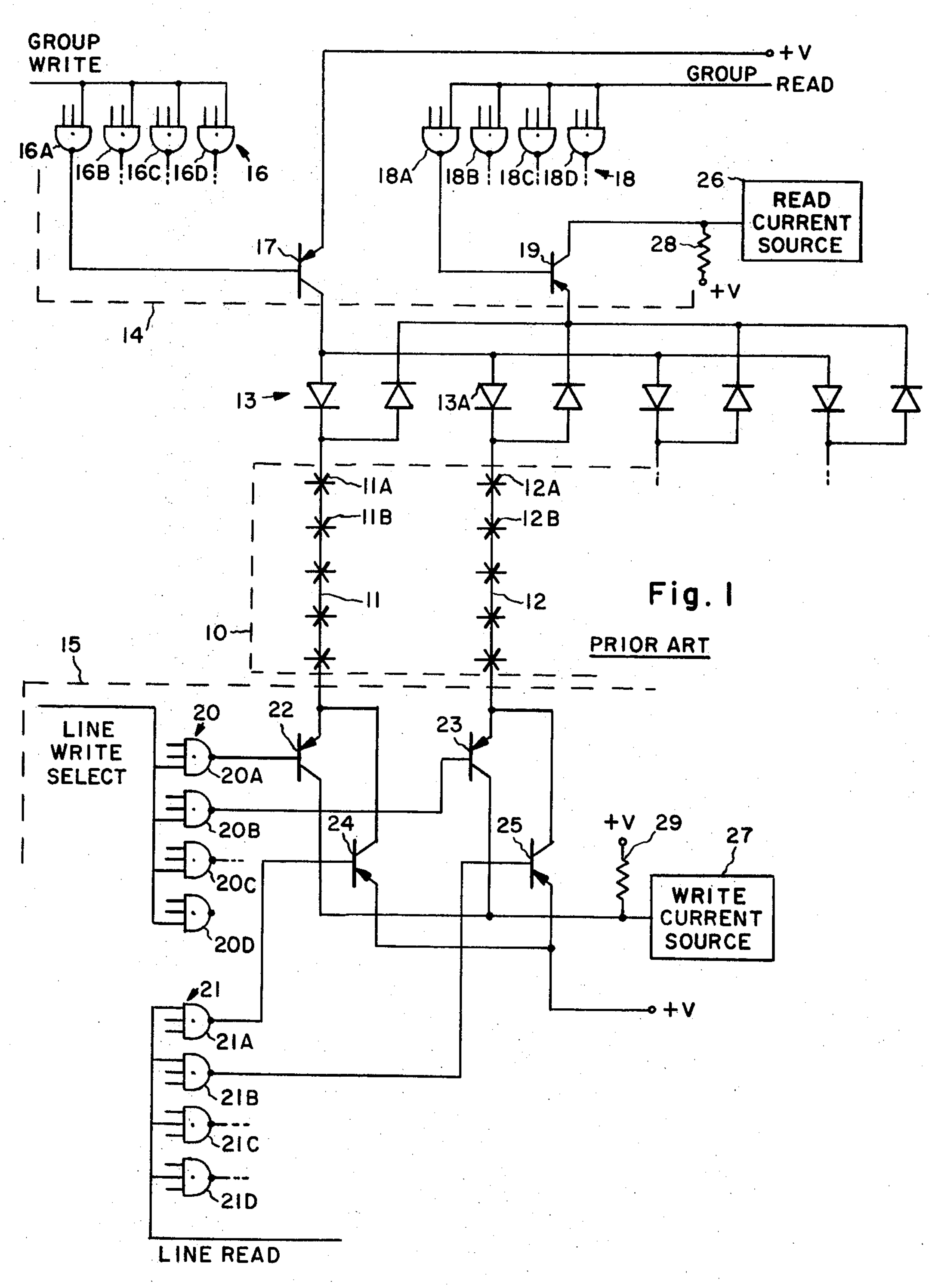
FIG. 1 is a schematic illustration of a typical transistor selection scheme used in prior art devices.

A current source is understood in the following description to be a source of either positive or negative current. A negative current source is commonly called a current sink. It is likewise understood that the choice of transistor types, NPN or PNP, and the polarity of the voltage source is arbitrary. Referring to FIG. 1, a typical memory matrix driving scheme such as is employed in a conventional memory system device is illustrated. A central memory matrix 10 is shown having two drive lines 11 and 12 which are illustrated for purposes of explanation herein. In actual practice, it is understood that a memory matrix may have many more than the two drive lines illustrated. Each of the drive lines 11 and 12 thread a plurality of cores, illustrated as 11A and 11B for drive line 11 and as 12A and 12B for drive line 12.

Although not shown, it is understood that the operation of a coincident current memory system employing cores such as are illustrated on lines 11 and 12 utilize additive current selection to switch the remanent characteristic of a magnetic core by means of a plurality of partial select currents coincident within a single core and having an additive current component generating a total field sufficient to switch the core from one state to the other. Although not shown, it is understood that each of the cores may include at least a further drive line threading the core and a sense line for sensing the change in condition of the cores. For purposes of ease of illustration, connections to a single drive line are shown. A particular drive line is selected within the memory matrix by the application thereto of a current pulse of desired magnitude. Devices which are utilized for applying currents of desired magnitude to drive lines are illustrated generally in FIG. 1 as a group common driver 14 and a line common driver 15. Each of the common drive circuits 14 and 15 include a plurality of gated transistor switches. The gated transistor switches of the group common unit 14 are connected to respective lines in the memory matrix 10 by means of a diode matrix 13. The other end of the drive lines with the memory matrix 10 are connected to gated transistor switches of the line common driver 15. Within the group common driver 14 are a plurality of gates illustrated generally in 16 and including gates 16A, 16B, 16C and 16D. Each of these gates are uniquely addressable by means of a combinatory code, each of the gates performing a logical NAND function. A common input to all the gates indicates when the gating unit is to perform its writing function by means of the input selecting one of the particular gates 16A—16D. Selection of one of the gates, for example 16A, will act to switch the transistor associated therewith, as illustrated in FIG. 1, transistor 17.

Performing a similar function for group reading are the plurality of gates indicated generally as 18 and including gates 18A, B, C and D and switching transistor 19. Each of the group write or group read gating circuitry acts to switch one of the transistors 17 or 19 for selecting a plurality of lines within the memory matrix. The individually desired line is then selected by appropriate gating circuitry within the line driver circuit 15. To this end, the line drive circuit 15 includes a further plurality of gates indicated generally as 20, and including gates 20A, 20B, 20C, and 20D, and a second group of gates indicated generally as 21 and including gates 21A through D. The gates 20A through D perform a line writing function, whereas the gates 21A through D perform a line reading function. Each of the gates, as in connection with the group command driver circuit 14, are of the NAND logic function, and respond to unique combinatorial code inputs for selecting one output of any of the particular gates within a group. The outputs of each of the gates are respectively connected to various transistor switches for selecting various lines. As illustrated in FIG. 1, the gates 20A and 20B are connected to transistors 22 and 23 respectively, whereas the gates 21A and 21B are connected respectively to the transistors 24 and 25. Each of the connections are made to the base electrodes of the transistor and operate such that the appearance of an output from any one of the selected gating circuitries when coupled to the base electrode of its associated transistor will be of a magnitude and polarity sufficient to switch the transistor from one given state to the other.

Each of the group common and line common drivers have associated therewith a read current source 26 and a write current source 27 respectively. The resistances 28 and 29 may respectively be connected in parallel with each of the current sources so as provide line terminations.

The arrangement of FIG. 1 operates as follows:

Assuming a write operation is to be performed, the gates 16A responds to the unique combinatorial code indicating the desired line to be driven and the writing operation to be performed so as to provide an output for switching the transistor 17. The transistor 17, which is normally nonconducting, is rendered conductive because of the forward biasing of the emitter base diode due to the source potential +V and the low pulse now appearing at the base of the transistor 17, and group selects all of the diode matrices connected to the collector electrode of the transistor 17. Once a group selection has been made, and in this case, the group selection would include both lines 11 and 12, a corresponding line selection is made by the application of a unique combinatorial code along the line selection circuitry so as to select for example gate 20B. Selection of the gate 20B renders the transistor 23 conductive, and a series current path is then formed beginning at source +V, continuing through transistor 17, through the diode 13A of the diode matrix 13, the drive line 12, the emitter collector path of the transistor 23, and the write current source 27. A suitable write selection pulse of, for example, a one-half switching magnitude pulse is now presentable on the line 12. For switching the individual cores, as for example core 12A, a further half selection pulse is coincidentally coupled thereto. The total coincident current of the two half select current pulses are sufficient to generate a flux of magnitude which will switch the remanent condition of the core 12A from one state to the other in accordance with the desired information. Assuming the write current source to contain precisely the current level which may be necessary to couple to the cores, it is noted that the transistor 23 will, by virtue of the base emitter path, cause a current to flow along the line 12 which exceeds the current of the write current source 27 by approximately the base emitter current flow. This additional current will, as explained above, act to reduce the marginal limits which may be expected of core operation. The necessity for providing large numbers of gating circuitry for selection in both read and write mode is also undesirable.

Figure 2:
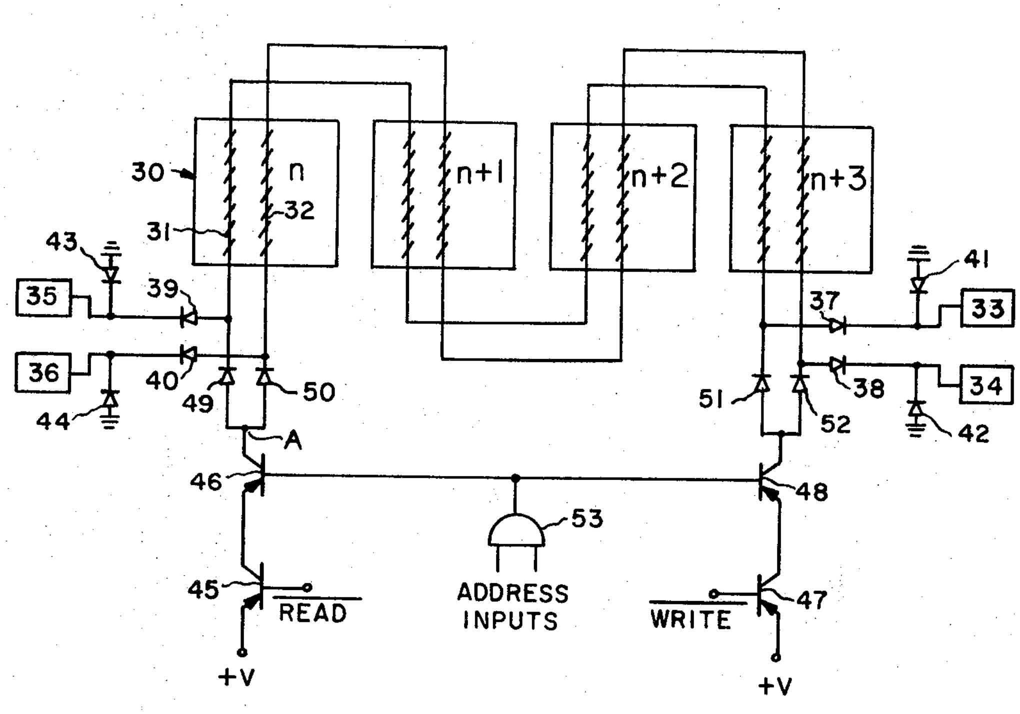
FIG. 2 is a simplified abbreviated schematic illustrating the operational principle of the present invention.

Referring now to FIG. 2, there is illustrated a simplified form of the invention. For purposes of illustration, only a single drive line is shown through each core, and only two drive line sets are shown. Many different types of winding patterns, which are well known, may be employed. In FIG. 2, as in FIG. 1, a memory matrix is shown and illustrated generally as an array 30, and having a first drive line 31 and a second drive line 32, each of which having a plurality of cores threaded thereon. The array 30 is shown with four selection planes $n$, $n$+1,$n$+2,$n$+3 coupled by each drive line. For purposes of illustration, four current sources are utilized, and shown generally as 33, 34, 35 and 36. The first current source 33 is coupled to the drive line 31 through a diode 37, the next current source 34 connected to the drive line 32 through a diode 38. Current source 35 is connected to the drive line 31, through a diode 39, whereas the current source 36 is connected to the drive line 32 through a diode 40. The current source 33 is connected to a reference point through a diode 41, while the current source 34 is connected to a reference point through a diode 42. A diode 43 couples the current source 35 to a reference point, whereas the diode 44 couples the current source 36 to a reference point. For the purpose of illustration the above reference points are indicated as ground potential. First and second selectively operable series connected transistor switches 45 and 46 are coupled from a potential source +V through a diode 49 to the drive line 31, and through a diode 50 to the drive line 32. A second set of selectively operable series connected transistor switches 47 and 48 are connected to a source of potential +V, and a first diode 51 to the other end of the drive line 31, and through a second diode 52 to the other end of the drive line 32. An address gating circuit 53 is commonly coupled to the bases of transistors 46 and 48, whereas the bases of transistor 45 and 47 are respectively coupled to a source of read and write logic circuitry, not shown. The gating circuitry 53 is of the NAND-logic function variety, producing an output in response to a unanimity of common polarity input signals.

The operation of the circuit of FIG. 2 is as follows:

If all the address inputs to the gate 53 are of for example a positive polarity, a negative output signal appears therefrom and is coupled to the respective bases of the transistors 46 and 48. In this condition, however, the transistors 45 and 47 will allow only leakage current to flow through the transistors 46 and 48 as long as the transistors 45 and 47 are maintained in their off condition by high base voltage levels. If a low level read pulse is now assumed to be applied to the base of the transistor 45, the transistor 45 will saturate. This in turn will cause the transistor 46 to saturate and a voltage of $+V-Vce$ of transistor 45 and $-Vce$ of transistor 46 is applied at the point A. If the current source 33 is conducting a current I through the diode 41 at this time, and current sources 34, 35 and 36 are all in the off condition, current will begin to build up through the diode 49, through drive line 31 and diode 37, in order to satisfy the requirements of the current appearing from the current source 33. In this condition, the diode 41 is in a back-biased state. In this manner a read operation can be performed through the line 31 of the memory matrix 30. Conversely if current source 34 were conducting current through diode 42 rather than current source 33 through diode 41 as described above, and a read pulse is again coupled to the base of the transistor 45, and transistors 46 and 48 are rendered conducting by the common address input gating circuit 53, then it will be the line 32 that is selected rather than the line 31. Writing operations are similarly accomplished by proper selections of the current sources and the base electrode of the write transistor 47.

Since the voltage source +V is designed to be much larger than the sum of the voltage drops across the saturated transistors the line diode and the selection lines, the amplitudes of line currents appearing through drive lines of the matrix would be governed only by the current sources 33, 34, 35 and 36. Thus the amplitudes of the base currents of the transistors 45, 46, 47 and 48 have absolutely no effect on the amplitudes of the line currents as long as the base currents are sufficient to saturate the respective transistors. The current through the various selected drive lines of the matrix can therefore be precisely controlled in that there are no bypasses or taps within the line in order to prevent the design current from actually flowing through the core line. Thus marginal requirements can be improved. The use of the additional transistors in series with the selection transistor for separating the read and write arrangement from the addressing allows the address inputs to be commonly placed on both read and write lines, the read and write line selection being made externally to the address gates with a significant saving in component requirement.

Figure 4:
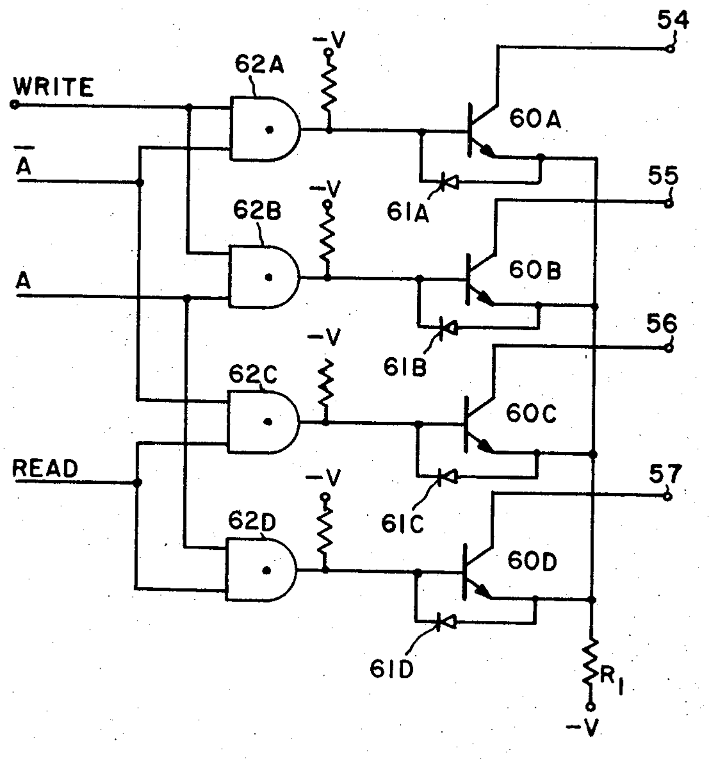
Figure 3:
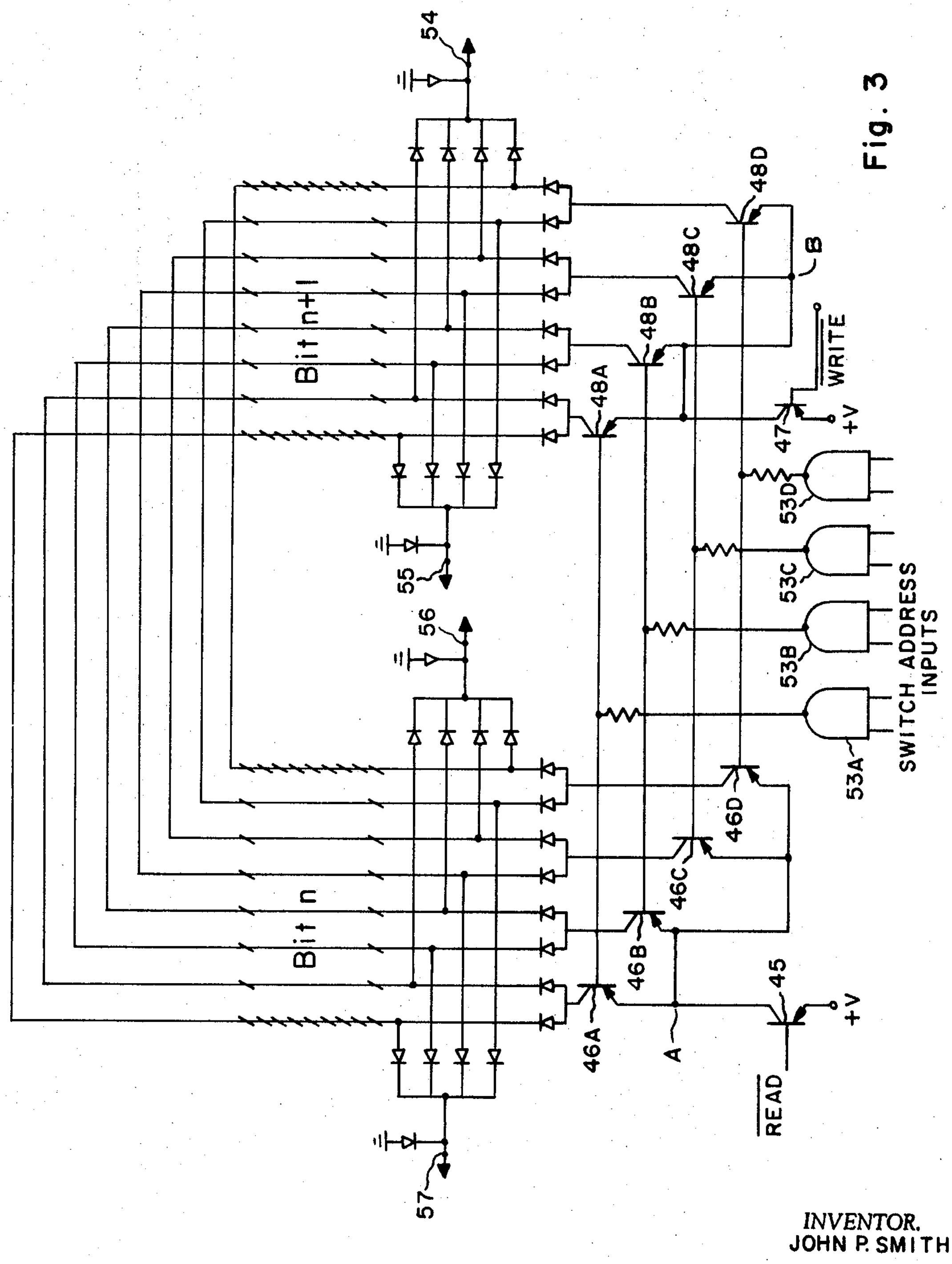
FIG. 3 illustrates the selection of scheme of FIG. 2 expanded to accommodate and illustrate a large and more typical selection system, and FIG. 4 a current source selector.

The drive selection scheme of the present invention therefore provides an improved marginal operation in that the current characteristic is precisely controlled and in the provision of a more advantageous manner of selection of drive lines. The latter point can be more readily realized and its effect more readily observed by reference to FIG. 3, wherein the basic selection scheme of FIG. 2 is expanded to accommodate a larger matrix by increasing the number of selection switches an d current sources. By the selection of current sources, as well as the switches, as a function of input and address, the number of current sources can be dramatically reduced. The operation of the circuit of FIG. 3 is otherwise similar to that of FIG. 2. The read segment transistor 46 of FIG. 2 is shown in FIG. 3 expanded into four transistors 46A, 46B, 46C and 46D each respectively connected between the common diode line termination and a first point A, each of them selecting a pair of lines as did transistor 46 in FIG. 2. Transistor 48 of FIG. 2 has similarly been expanded to four transistors 48A, 48B, 48C and 48 D each respectively connected between the common diode line termination and a second point B, each of these latter transistors similarly selecting a pair of lines. Read and write operations are again accomplished by transistors 45 and 47 which have been given the same reference numerals in FIG. 3 as in FIG. 2 as they perform precisely the same function. Addressing is accomplished by addressing units 53A, 53B, 53C, 53D, each switching respectively transistors 46A, 48A, 46B, 48B, 46C, 48C, 46D, 48D. The read and write transistors 45 and 47 respectively control which of the transistor series 46A through D or 48A through D will actually conduct current to the respective core lines. Current is applied through the source points 54, 55, 56, 57 in the direction of the arrows. As stated above, the current sources can each be uniquely selected as a function of the input addresses by means of suitable gating circuitry. An example of an address dependent current source is displayed in FIG. 4. The collectors of transistors 60A, 60B, 60C and 60D are connected respectively to points 57, 56, 55 and 54 of FIG. 3. The emitter of transistors 60A, 60B, 60C and 60D are connected together and to a resistor $R_1$. $R_1$ is connected to a negative potential −V. Diodes 61A, 61B, 61C and 61D are each connected across the base emitter junctions of the current source transistors. These diodes prevent breakdown of the base emitter junctions of those three transistors that are reversed biased when the remaining transistor is selected. The base of each transistor is respectively connected to the output of an AND gate 62A, 62B, 62C, 62D, and to a resistor which connects to −V. These resistors are typically 100 times larger than $R_1$. The appropriate current source 54, 55, 56 or 57 is selected by the positive coincidence of two signals, read, write, A,$\bar{A}$ at one of the four AND gates. The output of the selected AND gate rises to a positive potential from a potential of −V. A current is established in $R_1$ which is equal to $V+V_b-V_{be}/R_1$ where V is the negative reference potential, $V_b$ is the base voltage of the selected transistor, $V_{b3}$ is the base emitter voltage drop and $R_1$ is the resistor common to all transistor emitters.

Since only one of transistors 60A, 60B, 60C and 60D is selected at a given time, resistor $R_1$ defines the current for all transistors. A transistor when selected is nonsaturated. Hence, the base current is relatively small and does not contribute significantly to line current variations. Variations in line current of less than 1 percent may be obtained with low cost standard components.

It should be noted that the current source necessary in FIG. 3 operates to provide a single current in one of two directions. Since only one current source is selected at one time, the current sources can be in fact a single source, having two current directions and the selection circuit of FIG. 4 can operate to place the current source at the correct location with the correct polarity.

It is also conceivable to employ a plurality of current sources which can be selectively connected at the correct current point when desired.

The selection matrix of FIG. 3 is illustrated for eight drive lines and a two bit selection. It is understood, however, that in current practice more than two bits are selected, and that the entire selection is controlled by means of at least one further coincident selection line which would coincidentally enable each of the lines to select one of the cores coupled thereto. The obvious saving in transistor circuitry, as evidenced by a comparison between FIG. 3 and FIG. 1, indicate a saving in numbers of gates and transistors necessary for the e selection of a bit of information as well as providing selected core line.

While the invention has been described and shown with reference to certain preferred embodiments thereof, it will be understood by those skilled in the art that other changes in form and details may be made therein without departing from the spirit and scope of the invention.

What I claim is:

1. A magnetic memory matrix comprising a plurality of magnetic bistable storage elements, a driving circuit including a current pulse carrying drive line magnetically coupled to each of said elements said current pulse energizing said storage elements by means of a switching magnetic field of sufficient magnitude provided by said current pulse, said driving circuit providing that magnitude of current necessary to result in said switching, said driving circuit including a read current source connected to a first end of said drive line, a write current source connected to the other end of said drive line, a first set of two transistors having their emitter-collector paths serially connected between a potential source and one end of said drive line, a second set of two transistors having their emitter collector paths serially connected between said source of potential and the other end of said drive line, means for simultaneously selecting one of said transistors in each of said first and second sets of said transistors, and means for selectively addressing either one or the other of the remaining transistors in said first or said second set of transistors for completing a current path of either a first or a second direction through said drive line.

2. A magnetic memory comprising an array of magnetic elements each arranged in rows and columns, drive lines coupling each of said elements along the respective rows and columns, a selectively operable source of read current coupled to one end of each drive line, a selectively operable source of write current coupled to the other end of each drive line, a first selectively operable switch connecting one end of a drive line to a reference point and comprising first and second normally nonconductive transistors having their collector emitter paths serially coupled between the associated drive line and said reference point, a second selectively operable switch connecting the other end of a drive line to said reference point and comprising third and fourth normally nonconductive transistors having their collector emitter path serially connected between the associated drive line and said reference point, addressing means for selecting one of said current sources and the appropriate one of said switches so as to provide current from the selected current source to flow along said drive line, means for sending said first or said third transistor conductive for determining the source current direction through said associated drive line, and addressing means for selecting said second and fourth transistor for selecting said associated drive line.

3. A magnetic memory comprising an array of magnetic elements arranged in rows and columns, drive lines coupling each of said elements along the respective rows and columns, each pair of drive lines in said array being terminated at their first and second set of ends by first and second pairs of diodes oppositely poled with respect to the other and having the electrodes thereof remote from the drive line commonly terminated, a first plurality of transistors, the collector emitter path of each transistor of said first plurality respectively connected between each common diode termination of the first set of drive line ends and a first point, a second plurality of transistors, the collector emitter path of each transistor of said second plurality respectively connected between each common diode termination of the second set of drive line ends and a second point, a read transistor having its emitter-collector path connected between said first point and a point of operating potential, a write transistor having its emitter collector path connected between said second point and a point of operating potential, a write current source point provided at one end of each of the first lines of said set of drive line end with a first polarity and at one end of each the second lines of said first set of drive line end pairs with a second polarity, a read current source point provided at one end of each of the first lines of said second set of drive line end pairs with a first polarity and at one end of each of the second lines of said second set of drive line end pairs with a second polarity, first selection means selectively connected to said current source points and selecting one of a group of first ones of said sets or a group of second ones of said sets of drive lines, and second selection means selectively energizing a transistor of each of said first and second plurality of transistors for selecting a pair of said drive lines within said group, said first and said second selection means thereby energizing a single one of said drive lines.

4. The combination of claim 3 wherein said first selection means comprises a plurality of AND gates, a plurality of transistors, each transistor responsive to the output of a respective AND gate, each transistor having a diode interconnecting the base and emitter electrode thereof, and a first resistor common to all emitter electrodes for applying a first potential to each transistor, and a plurality of a second resistors, each applying a second source of potential to the base electrode of each transistor, each collector electrode of each said transistor uniquely energizable to provide the desired current flow upon a corresponding energization of said AND gates.

5. In a magnetic memory matrix, the combination comprising a plurality of magnetic storage elements, a plurality of drive lines coupled to the respective storage elements, a plurality of current sources for generating a current flow of fixed amplitudes, each source having an output respectively coupled to and in series current relationship with one end of a respective drive line, each current source having associated therewith a unidirectional current switch, a first plurality of selection switches coupled to the other end of said drive lines, a second plurality of selection switches coupled to said plurality of current sources, means coupled to said second plurality of selection switches for selecting one of said current sources and establishing a flow of said fixed amplitude current through the unidirectional current switch associated therewith, means coupled to said first plurality of selection switches for selecting one of said drive lines and reverse biasing said unidirectional current switch, thereby diverting said fixed amplitude current along said drive line, said current having a pulse form with a magnitude in said drive line which equals the magnitude of the current provided by said selected current source.

PO-1050
(5/69)

UNITED STATES PATENT OFFICE
CERTIFICATE OF CORRECTION

Patent No. 3,582,911 Dated June 1, 1971

Inventor(s) JOHN P. SMITH

It is certified that error appears in the above-identified patent and that said Letters Patent are hereby corrected as shown below:

Column 7, line 4, "$V_{b3}$" should be --$V_{be}$--

Column 7, line 31, delete "e"

Claim 3, line 20, after "end" (second occurrence) insert --pairs--

Signed and sealed this 25th day of July 1972.

(SEAL)
Attest:

EDWARD M.FLETCHER,JR.
Attesting Officer

ROBERT GOTTSCHALK
Commissioner of Patents